F. C. BROCK.
TIRE COVER.
APPLICATION FILED MAY 15, 1908.
907,453.
Patented Dec. 22, 1908.
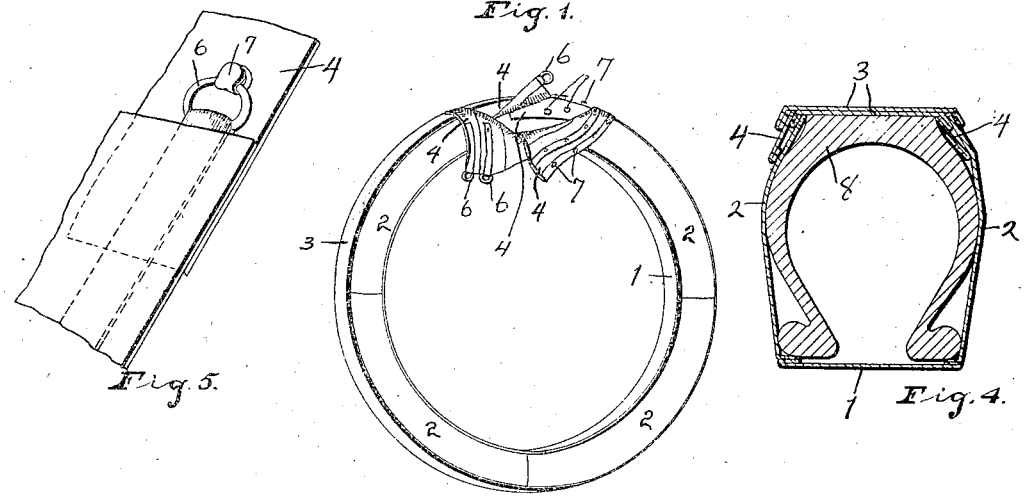
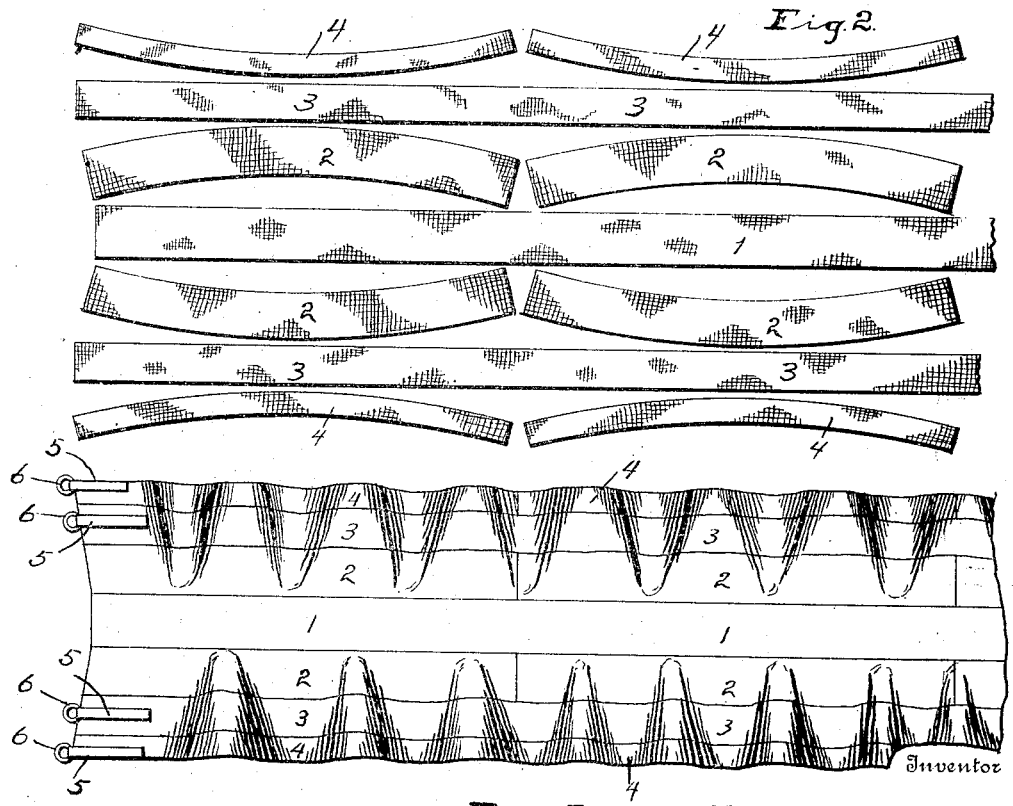
Witnesses
Carl Stoughton
A. L. Phelps
Inventor
Frederick C. Brock
By C. C. Shepherd
Attorney

UNITED STATES PATENT OFFICE.

FREDERICK C. BROCK, OF COLUMBUS, OHIO, ASSIGNOR TO THE VEHICLE APRON & HOOD COMPANY, OF COLUMBUS, OHIO, A CORPORATION OF OHIO.

TIRE-COVER.

No. 907,458.      Specification of Letters Patent.      Patented Dec. 22, 1908.

Application filed May 15, 1908. Serial No. 433,015.

*To all whom it may concern:*

Be it known that I, FREDERICK C. BROCK, a citizen of the United States, residing at Columbus, in the county of Franklin and State of Ohio, have invented certain new and useful Improvements in Tire-Covers, of which the following is a specification.

My invention relates to the improvement of tire covers of that class which are usually formed of a waterproof material and adapted to incase automobile tires when the latter are not in use.

The objects of my invention are to provide a tire cover of this class of improved construction by means of which a rubber tire may be covered and the cover retained in its place about the tire without the necessity of employing lacings or other indirect or tedious attaching devices; to so construct my improved cover as to provide a casing for a tire neat in appearance and capable of being readily applied thereto or removed therefrom. These objects I accomplish in the manner illustrated in the accompanying drawing, in which:

Figure 1 is a view in perspective of my improved tire cover showing the same as it appears upon a rubber tire and for the sake of clearness in illustration showing the ends of the cover disconnected, Fig. 2 is an inner face view showing the various sections which go to make up my improved tire cover, these sections being disconnected and arranged in their relative positions adjacent with which they are to be connected, Fig. 3 is an inner face view of a portion of the tire cover showing the sections which are illustrated in Fig. 2 united, Fig. 4 is a transverse section of a tire having my improved cover thereon, and, Fig. 5 is a detail view in perspective illustrating the manner of connecting the ends of the tire cover.

Similar numerals refer to similar parts throughout the several views.

The body of my improved tire cover is substantially in the form of an elongated strip of flexible and waterproof material within which the rubber tire is adapted to be incased or wrapped, said cover body being of desirable length and width to embrace or wrap a tire of a certain size.

It will readily be understood that in wrapping a circular tire within an elongated strip of material formed of one section, difficulty will be experienced in producing a neat and closely fitting wrapper for the tire, owing to the curvature of the latter. This difficulty I overcome by constructing my improved cover as follows:

1 represents the central section of the cover body which is in the nature of a comparatively narrow strip of material extending throughout the length of the cover and which has its longer edges formed straight and parallel as shown, portions of this strip being indicated in Figs. 2 and 3 of the drawing. To opposite edges of this straight central strip, I sew one after another the inner edges of outwardly curved sections 2 and to the outer edges of these curved strips 2, I secure the inner edges of straight sections or strips 3 which correspond substantially in form with the central section 1. This being accomplished I secure to the outer edges of the straight sections 3 one after the other throughout the length thereof, outer sections or strips 4 which are bowed or curved inwardly or in opposite directions from the curves of the strips 2. To the inner face of one end of the body thus formed, I secure longitudinally extending tapes 5 which at their outer ends carry rings 6, these tapes being preferably arranged in pairs, that is, two of said tapes being adjacent to one of the longer edges of the cover body and the remaining two adjacent to the opposite longer edge thereof. Near the remaining end of the cover body, I provide the outer face of said body adjacent to each of its longer edges with two rows of separated hooks 7.

In utilizing my invention, the cover formed as above described, is made to incase a tire such as is indicated at 8 in such manner that the central straight cover section 1 embraces or lies against the inner open side of the tire, as shown in Fig. 4, while the sections 2 embrace the sides of the tire and the straight sections 3 extend over the tire tread or bearing surface, one of said sections overlapping the other in the manner indicated in the drawing. The sections named being in this position on the tire, the edge strips which are composed of the outer sections 4 extend over and embrace opposite sides of the tread. When one half the cover has been thus wrapped about or made to partially embraces the tire body, one pair of the rings 6 which are carried by that part of the cover which has been utilized, are made to engage the desired hooks 7 of the corresponding half of the cover. The other half of the cover being now wrapped into engagement with the tire and with the first half applied thereto, a complete closure and fastening of the ends of the cover, is attained by securing the remaining rings 6 about two of the remaining hooks.

Assuming that the tire cover is constructed of one piece of material, it is obvious that wrapping the same about the circular tire in the manner above described, would result in a puckering or bagging of the material at various points throughout the tire, thereby producing an unsightly and ill-fitting cover. It has been found, however, that by constructing the cover body as herein described, i. e., of an alternate arrangement of straight sections and a plurality of curved sections, a cover body is produced which will conform to the curvature of the tire and which when wrapped about the tire in the manner described, has the appearance of a close fitting and comparatively smooth external tire covering or casing.

What I claim, is:

A tire cover comprising a straight central strip 1, a plurality of outwardly curved strips having their inner edges united to opposite sides of said central strip, straight strips 3 having their inner edges united to the outer edges of said curved strips 2, and inwardly curved strips 4 having their inner edges united to the outer edges of said straight strips 3 and means for connecting the ends of said tire cover together.

In testimony whereof I affix my signature in presence of two witnesses.

FREDERICK C. BROCK.

Witnesses:
L. CARL STOUGHTON,
A. L. PHELPS.